(12) United States Patent
Kania et al.

(10) Patent No.: US 7,810,279 B2
(45) Date of Patent: Oct. 12, 2010

(54) BUOYANT WETLAND SYSTEM

(75) Inventors: Bruce G. Kania, Shepherd, MT (US); Frank M. Stewart, Bozeman, MT (US)

(73) Assignee: Fountainhead, LLC, Shepherd, MT (US)

( * ) Notice: Subject to any disclaimer, the term of this patent is extended or adjusted under 35 U.S.C. 154(b) by 156 days.

(21) Appl. No.: 12/297,210

(22) PCT Filed: Mar. 25, 2007

(86) PCT No.: PCT/US2007/064869
§ 371 (c)(1), (2), (4) Date: Oct. 14, 2008

(87) PCT Pub. No.: WO2007/124226
PCT Pub. Date: Nov. 1, 2007

(65) Prior Publication Data
US 2009/0165374 A1  Jul. 2, 2009

Related U.S. Application Data

(60) Provisional application No. 60/745,394, filed on Apr. 21, 2006.

(51) Int. Cl.
*A01G 31/00* (2006.01)
(52) U.S. Cl. ....................................... 47/59 R
(58) Field of Classification Search ................. 47/59 R, 47/63, 64
See application file for complete search history.

(56) References Cited

U.S. PATENT DOCUMENTS

| | | |
|---|---|---|
| 3,927,491 A | 12/1975 | Farnsworth |
| 4,037,360 A | 7/1977 | Farnsworth |
| 4,086,161 A | 4/1978 | Burton |
| 4,487,588 A | 12/1984 | Lewis, III et al. |
| 4,536,988 A | 8/1985 | Hogen |
| 5,106,504 A | 4/1992 | Murray |
| 5,143,020 A | 9/1992 | Patrick |
| 5,224,292 A | 7/1993 | Anton |
| 5,261,185 A | 11/1993 | Koide et al. |
| 5,312,601 A | 5/1994 | Patrick |
| 5,337,516 A | 8/1994 | Hondulas |
| 5,528,856 A | 6/1996 | Smith et al. |
| 5,766,474 A | 6/1998 | Smith et al. |
| 5,799,440 A | 9/1998 | Ishikawa et al. |
| 5,836,108 A | 11/1998 | Scheuer |

(Continued)

FOREIGN PATENT DOCUMENTS

WO  WO 2005058025 A2 * 6/2005

(Continued)

*Primary Examiner*—Francis T Palo
(74) *Attorney, Agent, or Firm*—Antoinette M. Tease

(57) ABSTRACT

A buoyant habitat system comprising an island body or submersible growing area, at least one solid elevated growing area and at least one hollowed-out elevated growing area. Preferably, the island body or submersible growing area has a top surface and is comprised of a nonwoven matrix that is injected with buoyant foam. Preferably, the at least one solid elevated growing area is attached to said top surface and is comprised of a nonwoven matrix that is injected with buoyant foam. Preferably, the at least one hollowed-out elevated growing area is attached to said top surface and is comprised of an outer ring of said nonwoven matrix that encircles a portion of growth medium.

12 Claims, 3 Drawing Sheets

U.S. PATENT DOCUMENTS

| | | | |
|---|---|---|---|
| 5,980,738 | A | 11/1999 | Heitkamp et al. |
| 6,014,838 | A | 1/2000 | Asher |
| 6,086,755 | A | 7/2000 | Tepper |
| 6,555,219 | B2 | 4/2003 | Kosinski |
| 7,555,866 | B2 * | 7/2009 | Kania et al. ................. 47/59 R |
| 2003/0051398 | A1 | 3/2003 | Kosinski |
| 2003/0208954 | A1 | 11/2003 | Bulk |
| 2005/0183331 | A1 * | 8/2005 | Kania et al. ................. 47/65.5 |
| 2009/0165374 | A1 * | 7/2009 | Kania et al. ................. 47/65.5 |

FOREIGN PATENT DOCUMENTS

WO    WO 2007124226 A2 *  11/2007

* cited by examiner

BUOYANT WETLAND SYSTEM

CROSS-REFERENCE TO RELATED APPLICATION

This application claims priority back to U.S. Patent Application No. 60/745,394, filed on 21 Apr. 2006.

BACKGROUND OF THE INVENTION

This invention relates to floating plant habitat. In particular, the invention relates to a floating wetland system or plant habitat.

Emergent aquatic plants can grow only in relatively shallow waters, because the stems of the plants must be able to extend from the bottom of the water body up through the water column into the air. When the water depth exceeds the maximum possible stem length for a particular plant species, the plant cannot grow at this location. In other locations, although the water depth is suitable, the water clarity is poor, thus preventing light from reaching deep enough to start the plant growth.

In many instances, it is desirable to grow emergent aquatic plants in waters that are too deep or too dark to naturally sustain the plants. Floating planters or floating islands provide a means of growing emergent aquatic plants in waters that are otherwise unsuitable for bottom-rooted plant growth.

Background art floating planters typically have a plant growth medium that extends above waterline. This is not a natural situation because the stems of naturally occurring aquatic plants typically emerge through open water into the air. When aquatic plants are grown in background art floating planters, the plant stems emerge through the planter's growth medium, thereby creating an unnatural appearance for the aquatic plant habitat. In addition to their unnatural appearance, many background art floating planters are constructed of a relatively complex and expensive combination of materials, making these products too expensive for large-scale applications that cover many square feet of water surface.

The background art is characterized by U.S. Pat. Nos. 5,224,292; 5,528,856; 5,766,474; 5,980,738; 6,086,755; and 6,555,219 and U.S. Patent Application Nos. 2003/0051398; 2003/0208954; 2005/0183331; the disclosures of which patents and patent applications are incorporated by reference as if fully set forth herein.

BRIEF SUMMARY OF THE INVENTION

The present invention overcomes the background art problems of unnatural appearance and high cost. Preferred embodiments of the present invention provide a means of growing aquatic plants whereby their stems emerge from open water, thereby creating a natural appearance for the plant. In addition, the materials and construction methods for preferred embodiments of the present invention are relatively inexpensive, making the invention suitable for applications that cover large surface areas. Finally, preferred embodiments of the present invention provide for a combination of submerged and elevated growing zones, whereby the invention closely imitates the natural appearance of aquatic plants growing in open water in between a group of plant-covered islands, and provides a rich and diverse habitat for colonization by beneficial microbes, insects, and other organisms.

The present invention has a number of advantages. In preferred embodiments, it provides a natural wetland appearance, in contrast to the "planter-box" appearance of the prior art, making it particularly useful for decorative waterscaping applications. In a preferred embodiment, the present invention is relatively inexpensive, easy to construct, and easy to install in both small-scale (<25 square feet) and large scale (25 to >25,000 square feet) applications. The suitability for large-scale applications makes the present invention particularly useful for water treatment applications, where the unit cost (dollars per square foot) of the product must be minimized in order for the technology to compete with alternate treatment methods.

In preferred embodiments, the present invention provides a platform ideally positioned to sustain the light and water and nutrient requirements of wetland and facultative wetland plants (plants adopted to both wet and dry cycles) and synergize that platform with more buoyant, higher elevated floating islands. Preferably, the more buoyant and higher elevated islands are physically bonded to the submerged platform. The combination disclosed here provides at least two independent plant habitats: the submerged platform for wetland plants and the raised bed for conventional plant types. This wide range of growing conditions promotes ecological diversity and complexity that is desirable for both aesthetic and water-treatment applications.

In preferred embodiments, the present invention provides a low-cost source of shade. It can also dampen wave action. It may also be made of appropriate colors to either absorb heat or minimize heat absorption.

In preferred embodiments, the matting in accordance with the invention is sufficiently malleable to allow for containment of bulbs or bedding plants or large seeds until plant roots bond into it. Preferably, the matrix or matting disclosed herein is sufficiently rigid to prevent fish from totally consuming young plants, while still allowing air bubbles and water to readily filter through it. Preferably, the matrix disclosed herein provides a high level of surface area for colonization by beneficial microbes and also readily accepts additional matrix. The bottom of the island, for example, is preferably suitable for attachment of off-size or trim pieces of matrix, which allows the user to use scrap material to provide additional microbe habitat as well as added barrier for root and plant protection from grazing fish.

In preferred embodiments, the system disclosed herein allows for readily achieving naturalized shapes of random size island systems. The elevated, more buoyant islands of preferred embodiments of the invention are an attachment point for additional strips of submerged platform. When positioned over a seam, they allow for adhesive foam to lock parallel strips of matrix together while at the same time supporting the strips at the desired level.

Preferred embodiments of the invention allow for various kinds of plant propagation, including seeding, sodding, planting of bedding plants, and bulbs or bare root plants on the elevated component, and all but sod on the wetland (submerged) portion. Background art systems are significantly more restricted in that they allow only for hydroponic propagation on floating structures. Except in the case of fortuitous aeration, which may or may not occur in many natural water bodies, only wetland plants would thrive in such a hydroponic condition. Preferred embodiments of the invention provide for interstitial air spaces above the waterline, so that terrestrial plants can thrive whether or not the waterway is sufficiently aerated. Aquatic plants can also thrive on the floating islands because their roots can grow in the saturated zone within and beneath the islands. The present invention is useful, therefore, for growing both aquatic and terrestrial plants because both saturated and unsaturated zones are provided.

One object of a preferred embodiment of the invention is to provide rich and diverse, but relatively inexpensive, habitat for aquatic (wetland and facultative wetland) and terrestrial plants and associated organisms that allows the plants to have a natural appearance. Another object of a preferred embodiment of the invention is to provide shade to and minimize heat absorption by ponds. Another object of a preferred embodiment of the invention is to support a variety of methods of plant propagation.

In a preferred embodiment, the invention comprises an island body that is comprised of a nonwoven matrix that is injected with buoyant foam. The matrix is preferably comprised of polyester fibers that are intertwined to form a randomly oriented web or "blanket" with a standard thickness and width. Preferably, the dimensions of the island body are established by attaching multiple pieces of matrix side-by-side and vertically.

In groundwater hydrology, the zones of the subsurface that contain water are split into the "saturated zone" and the unsaturated or "vadose zone." The saturated zone is the area of the subsurface that lies at or below the water table. When a well is drilled into the saturated zone, the level of standing water in the well is equivalent to the level of the water table.

The vadose zone is the portion of the subsurface that contains some water but is above the saturated zone. The pore spaces between the soil or rock particles in the vadose zone contain a combination of water and air. Vadose zone water (or "vadose water") is held in place by hydroscopic and capillary forces. The maximum amount of water that can be held in a particular vadose zone is a function of the particle size and shape of soil elements. Excess water that enters the vadose zone (for example, from rainfall) drains by gravity through the vadose zone down to the saturated zone. Terrestrial plants have evolved to thrive in the vadose zone, as they require a growth medium in which their roots can uptake both water and air. Aquatic plants, in contrast, have evolved to thrive in the saturated zone; these plants do not need air-filled pore spaces around their roots.

In the descriptions of the floating island embodiments disclosed herein, the applicants use the term "saturated zone" to describe the portion of the island body that is located below the water line of the body of water in which the island is floating. The pore spaces in the island body that are within the saturated zone are completely filled with water.

The vadose zone in a floating island can be supplied by water from the top down, for example, by rainfall. In addition, the vadose zone in a floating island can be supplied with water from the bottom up, via capillary action. Since this "bi-directional" water supply capability of floating islands is different from the "top-down only" water supply in conventional agricultural vadose zones, we have coined the term "bi-vadose" zone to define the unsaturated zone within the floating islands. The bi-vadose zone comprises the moist portion of the island body that is above the saturated zone. In the bi-vadose zone, the pore spaces within the island body contain a mixture of air and water. The bi-vadose zone does not become saturated with water because any excess water that enters this zone drains down through the fibers by gravity.

In a preferred embodiment, the invention is a buoyant habitat system comprising: an island body having a top surface, said island body being comprised of a non-woven matrix that is injected with buoyant foam; at least one solid elevated growing area that is attached to said top surface, said solid elevated growing area being comprised of a non-woven matrix that is injected with buoyant foam; and at least one hollowed-out elevated growing area that is attached to said top surface, said hollowed-out growing area being comprised of an outer ring of said non-woven matrix that encircles a portion of growth medium. Preferably, said non-woven matrix is comprised of fibers that are intertwined to form a blanket. Preferably, said buoyant foam is a polyurethane foam. Preferably, said buoyant foam has a density in the range from 1.0 to 25.0 pounds per cubic foot. Preferably, said growth medium comprises peat, topsoil, hydrophilic foam, or a combination of these materials. Preferably, said fibers are polyester fibers. Preferably, said fibers have a diameter in the range of about 6 to about 300 denier. Preferably, a water-based latex binder is baked onto said fibers. Preferably, said non-woven matrix has a thickness of about eight inches. Preferably, said island body comprises a bubble-trapping region having a permeability to bubbles that is lower than the permeability of other regions of said island body. Preferably, said bubble-trapping region is comprised of peat or polyethylene.

In another preferred embodiment, the invention is a buoyant simulated wetland system comprising: a normally-submerged, buoyant plant habitat, said normally-submerged plant habitat comprising a first buoyant blanket assembly that comprises a first non-woven mat and a first plurality of buoyant bodies disposed within said first non-woven mat; at least one first normally-not-submerged plant habitat that is attached to said top surface, said at least one normally-not-submerged plant habitat being comprised of a second buoyant blanket assembly that comprises a second non-woven mat and a second plurality of buoyant bodies disposed within said second non-woven mat; and at least one second normally-not-submerged plant habitat that is attached to said top surface, said at least one second normally-not-submerged plant habitat being comprised of a container of said non-woven mat that encircles a portion of growth medium. Preferably, said non-woven mat is comprised of fibers that are intertwined to form a blanket. Preferably, each of said plurality of buoyant bodies is comprised of a polyurethane foam. Preferably, each of said plurality of buoyant bodies has a density in the range from 1.0 to 25.0 pounds per cubic foot. Preferably, said growth medium is selected from the group consisting of peat, topsoil, hydrophilic foam, and a combination of these materials. Preferably, said fibers are polyester fibers. Preferably, said fibers have a diameter in the range of about 6 to about 300 denier. Preferably, a water-based latex binder is baked onto said fibers. Preferably, said non-woven matrix has a thickness of about eight inches. Preferably, said normally-submerged, buoyant plant habitat comprises a bubble-trapping region having a permeability to bubbles that is lower than the permeability of other regions of said normally-submerged, buoyant plant habitat. Preferably, said bubble-trapping region is comprised of peat or polyethylene.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings, which illustrate presently preferred embodiments of the invention.

REFERENCE NUMBERS

Figure 1:
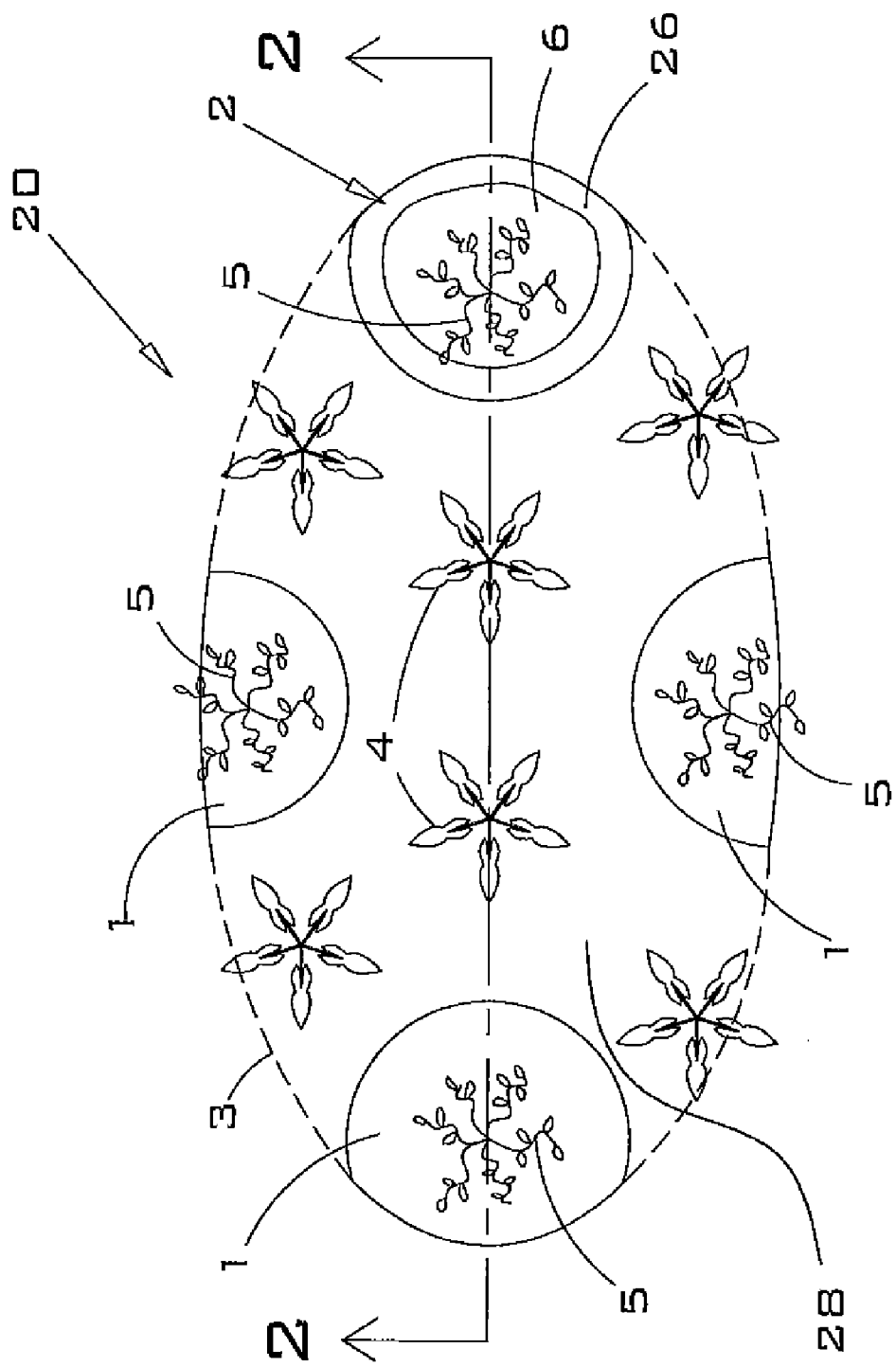
FIG. 1 is a top plan view of an island body in accordance with a preferred embodiment of the invention in which a portion of the planted area is designed to be submerged below water level.

The following reference numerals are used to indicate the parts and environment of the invention on the drawings:
1 solid elevated growing areas, first normally-not-submerged plant habitats
2 hollowed-out elevated growing areas, second normally-not-submerged plant habitats
3 submerged growing area, normally-submerged plant habitat, submersible growing area, island body
4 emergent aquatic plants
5 terrestrial plants
6 growth medium
7 buoyant foam
8 bi-vadose zone
9 denitrifying bacteria
10 bubbles
11 first portion (of bubbles)
12 root and matrix fibers
13 low permeability layer
14 second portion (of bubbles)
15 third portion (of bubbles)
20 buoyant habitat system, buoyant simulated wetland system
22 water
24 waterline
26 outer ring
28 matrix, mat

DETAILED DESCRIPTION OF THE INVENTION

Figure 2:
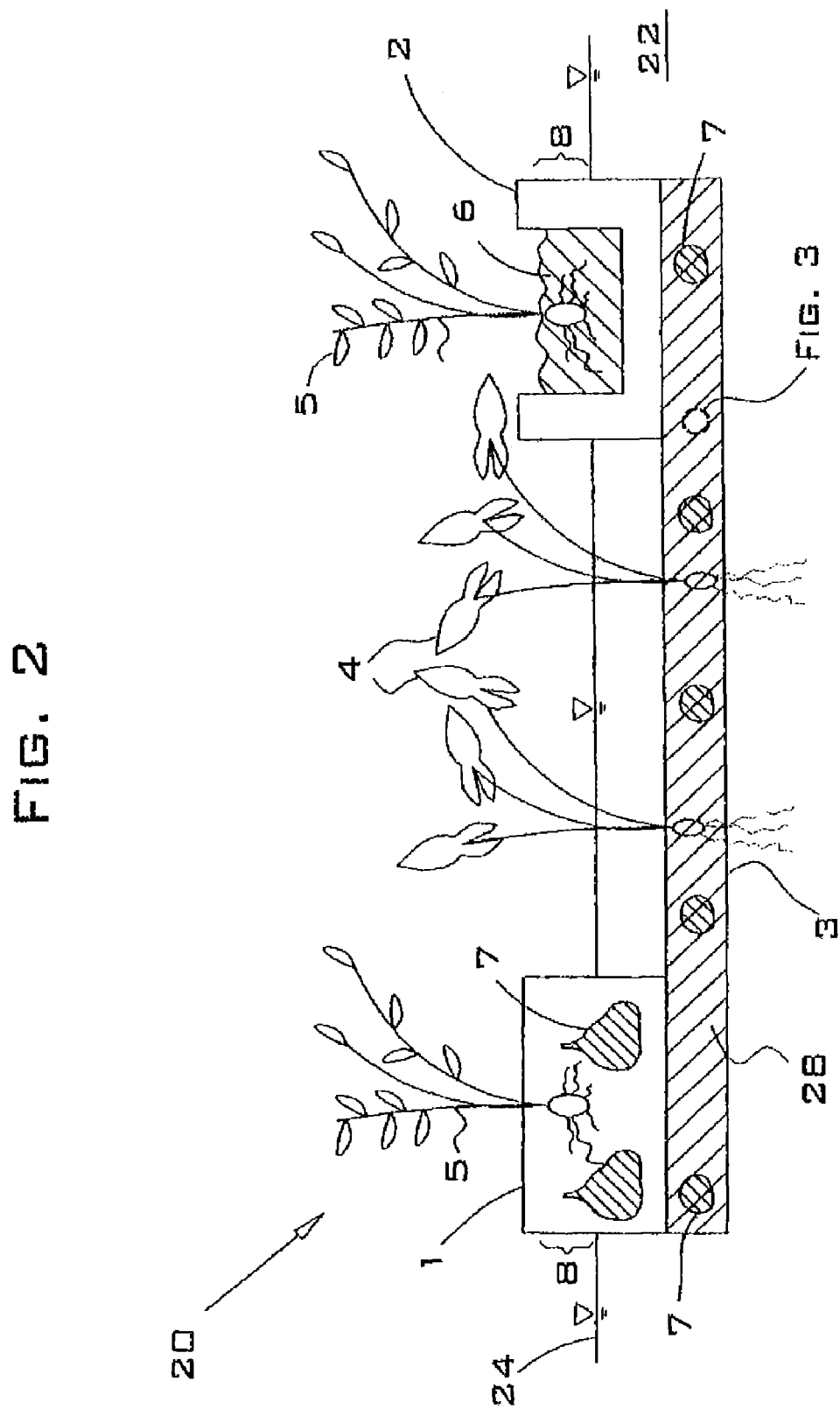
FIG. 2 is a side cross-sectional view of the island body of FIG. 1.

Referring to FIG. 1, a preferred embodiment of buoyant habitat system 20 is illustrated. Solid elevated growing areas 1 and submerged (or submersible) growing area or island body 3 are comprised of solid pieces of non-woven polyester matrix or mat 28 with injected buoyant foam 7 (the mat 28 and foam 7 are shown in FIG. 2). Hollowed-out growing area 2 is comprised of outer ring 26 of non-woven (e.g., polyester) matrix that is filled with a portion of growth medium 6. Growth medium 6 may be comprised of any material suitable for sustaining plant growth, such as peat, topsoil, hydrophilic foam, or a combination of these materials.

In a preferred embodiment, the matrix or mat is comprised of 200-denier polyester fibers that are intertwined to form a blanket approximately 1¾ inch thick by 56 inches wide. The matrix is preferably produced in a continuous strip and cut to lengths of approximately 90 feet for shipping. Preferably, the nominal weight of the blanket is 41 ounces per square yard, and the nominal weight of the polyester fibers within the blanket is 26 ounces per square yard. A water-based latex binder is preferably baked onto the fibers to increase the stiffness and durability of the blanket.

The characteristics of the matrix may be adjusted by varying the construction materials and manufacturing process. For example, the diameter of the fibers may be varied from approximately 6 to 300 denier. Coarse fibers result in a relatively stiff matrix with relatively small surface area for colonizing microbes, while fine fibers result in a relatively flexible matrix with a relatively large surface area for colonizing microbes. The latex binder can be applied relatively lightly or relatively heavily to vary the durability and weight of the matrix, and dye or pigment can be added to the binder to produce a specific matrix color. The thickness of the blanket can be adjusted from approximately ¼-inch to 2 inches using preferred manufacturing techniques. The applicants anticipate that thicker blankets will be produced in the future, and these thicker blankets (for example, 3 to 12 inches) will be used as island body material when they become available. The blankets with integral latex binder may be purchased as a manufactured item. One manufacturer of suitable matrix material is Americo Manufacturing Company, Inc. of Acworth, Ga.

In a preferred embodiment, a means for internal buoyancy is integrated within the island body by injecting uncured liquid polyurethane resin under pressure into the porous matrix or mat. The polyurethane resin then expands and cures in place within the matrix. The injection pressure, resin temperature, and injection shot volume of the foam injection machine are preferably preset so as to provide the desired final volume of cured buoyant foam. The foam may be installed so as to provide a continuous volume throughout the matrix, or alternately, it may be installed so as to provide individual buoyant sections of foam within the matrix that are separated by non-foamed zones of matrix. The polyurethane resin may be injected from the top, sides, or bottom of the island, or from a combination of these surfaces, depending on the particular application of the island.

In a preferred embodiment, the island matrix is constructed so as to have a thickness of approximately 8 inches. Uncured foam resin having a nominal cured density of 2.5 pounds per cubic foot (pcf) is preferably injected into the bottom of the matrix, and penetrates to the top surface of the matrix. A four-second shot of uncured foam is injected with a pressure of approximately 70 pounds per square inch, resulting in a cured mass of foam approximately spherical in shape, having a diameter of approximately 8 inches. The sphere has a density of approximately 5.8 pcf, consisting of approximately 2.5 pcf polyurethane foam that is reinforced with matrix having a density of approximately 3.3 pcf. The density of the polyurethane foam may be adjusted by varying the chemical formula of the resin, or by varying the application parameters such as temperature and pressure.

Preferred ranges of foams for use in the islands disclosed herein range in density from about 1.0 to 25.0 pcf. The lighter foams are desirable where high buoyancy and low cost are important, for example, for decorative water garden islands. The heavier density foams are preferable where high strength and durability are important, for example, where the islands may be subjected to boat impacts. The foamed zones of the matrix may be optionally coated with a spray-on polyurethane outer covering to increase durability. Alternately, self-skinning foams that cure with a tough outer cover may be used to provide extra durability.

Referring to FIG. 2, the roots of aquatic plants 4 penetrate through the submerged growing area 3 into body of water 22. In this embodiment, aquatic plants 4 receive their nutrients hydroponically, from dissolved nutrients in the water body. The roots of terrestrial plants 5 grow mostly within the bi-vadose zone 8, where they are exposed to damp but unsaturated water conditions. These roots may obtain nutrients from the water body, from the growth medium 6, and from supplemental fertilizer additives that are applied to the surface of island body 3.

Some of the buoyancy in natural floating islands is preferably provided by gases that are produced and trapped within the island body below waterline. These naturally produced gases provide self-sustaining buoyancy for island body 3. Gases present in natural floating islands are produced by bacteria and other microbes as part of their metabolic processes. One example of a common gas-producing microbe that is present in floating islands is the denitrifying bacteria *Pseudomonas* sp. Denitrifying bacteria convert nitrate that is present in the water to nitrogen gas. A portion of the produced nitrogen dissolves into the water, and a portion forms bubbles that rise through the water column. A portion of these rising bubbles become attached to solid objects within the submerged portion of the island body via the surface tension of the bubbles. The bubbles are produced more or less continuously, and are constantly attaching and detaching from objects as they migrate upward through the submerged portion of the island body toward the water surface. Gas bubbles that are attached to objects within the island produce a positive buoyant force on island body 3.

In preferred embodiments, island body 3 contains regions of relatively low permeability that slow the exit rate of the bubbles during their upward migration. These zones of low permeability may be comprised of organic detritus, trapped clay particles, or any other dense, fine-grained materials that are present within island body 3. When the rate of gas bubble production exceeds the rate of gas escape through a low permeability region, bubbles accumulate below and within the region. These accumulated bubbles also contribute buoyancy to buoyant habitat system 20.

Figure 3:
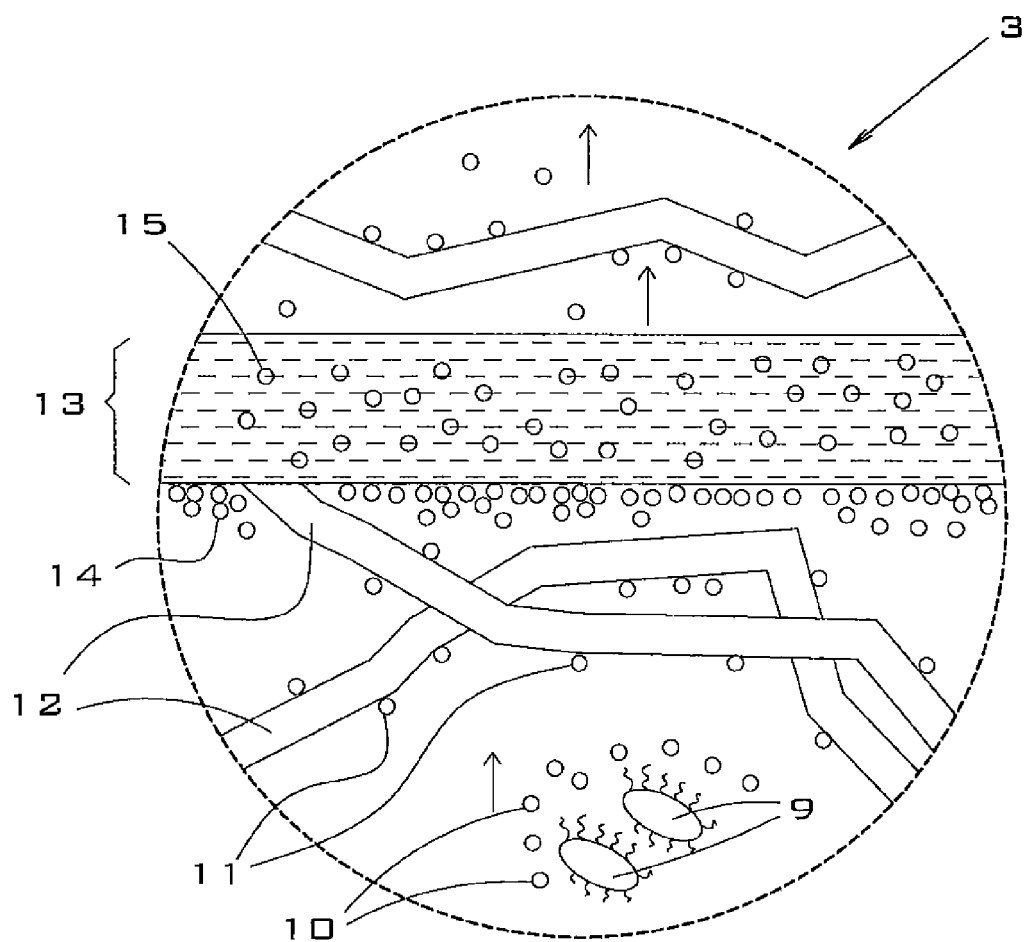
FIG. 3 is a schematic representation of a microscopic view of a portion of the island body shown in FIG. 2.

Referring to FIG. 3, a schematic representation of a microscopic view of a portion of the island body 3 is presented. Manufactured floating islands 20 may be designed to produce self-sustaining buoyancy by mechanisms similar to those that exist in natural floating islands. FIG. 3 illustrates the self-sustaining buoyancy mechanisms of a manufactured floating island that replicate the self-sustaining buoyancy of natural floating islands. As shown in the FIG. 3, denitrifying bacteria 9 produce gas bubbles 10 that rise upward as shown by the arrows. A first portion 11 of the gas bubbles adhere to root and matrix fibers 12 below waterline 24, providing an upward force or buoyancy to island body 3. In addition, low permeability layer 13 below waterline impedes the upward migration of the bubbles, causing a second portion 14 of the bubbles to accumulate at the lower surface of the low permeability layer 13, and third portion 15 of the bubbles to accumulate within the low permeability layer 13, providing an additional buoyant force to the island. In a manufactured floating island, the low permeability layer 13 may be comprised of natural materials such as peat, or synthetic materials such as polyethylene. In addition, low permeability regions may naturally evolve over time in a manufactured island by production of detritus from dead plants, microbes and suspended particles collected from the water, thereby resulting in increased buoyancy as the island matures.

In many cases, it is desirable to add dissolved oxygen or other gases to water 22. One example is using floating islands for water treatment to remove excess ammonia from wastewater by converting it to nitrate. When nitrifying bacteria convert ammonia to nitrate, they require both oxygen and carbon dioxide. These gases become depleted from the water by the metabolic action of the bacteria and must be replenished in order for the metabolic process to continue. The gases naturally recharge the water body by transferring from the atmosphere to the water at air-water interface 24, but at a relatively slow rate. When water 22 is forced into the island matrix by wave action at the water surface, an air-rich froth is produced. The froth provides a region of relatively rapid transfer of oxygen and carbon dioxide into the water, by means similar in function to those of aerators that bubble compressed air through the water column. This high rate of gas transfer into the water increases the beneficial microbial activity in the water.

In another preferred embodiment, the submerged island body 3 is positioned approximately 10 inches below waterline 24, thereby enabling a shallow-draft boat such as a canoe to pass over the submerged zone of the island. This configuration is useful for applications where portions of the island may require human contact, for example, to harvest flowers. Alternately, the submerged island body 3 may be designed to be deeper than 10 inches below waterline. For example, the submerged zone may be set at 3 feet below waterline for the growth of non-emergent aquatic plants such as pondweed or wild celery. This deeper configuration may be useful for growing plants for the purpose of water quality remediation or waterfowl food production.

In preferred embodiments, the island bodies can provide up to approximately 57 pounds of buoyancy per cubic foot of island body 3. By way of example, this level of buoyancy is achieved when a zone of island body matrix is completely filled with injected foam having a density of 2.5 pounds per cubic foot (pcf). In this example, the weight of the un-foamed matrix in air is about 3.3 pcf, and the weight of the foam in air is about 2.5 pcf. When the matrix is injected with foam, the total weight of the foamed matrix is equal to the weight of the foam plus the weight of the matrix fibers within the foam, or about (2.5+3.3)=5.8 pcf. (The foam weight is actually about 5% less than this, because slightly less than 1 cubic foot of pure foam will be required to fill one cubic foot of matrix).

The buoyancy of an object can be determined by subtracting the density of the object from the density of water. Fresh water has a density of about 62.4 pcf, so the foamed matrix will provide a buoyancy of about (62.4−5.8)=56.6 pcf. In other words, one cubic foot of foamed matrix floating in water could support a maximum weight of 56.6 pounds without sinking. If a very dense foam is used (for example, 10 pcf), the density of foamed matrix is (10.0+3.3)=13.3 pcf. The buoyancy of this foam-filled matrix is (62.4−13.3)=49.1 pcf, which is still very significant. In a preferred embodiment, island body 3 is designed to provide higher-than-average buoyancy at selected zones of the island; for example, high-buoyancy walkways that support human traffic along specific portions of the island surface.

Many variations of the invention will occur to those skilled in the art. Some variations include island bodies containing smaller or larger amounts of injected foam. Other variations call for island bodies having a bubble-trapping region. All such variations are intended to be within the scope and spirit of the invention.

Although some embodiments are shown to include certain features, the applicant(s) specifically contemplate that any feature disclosed herein may be used together or in combination with any other feature on any embodiment of the invention. It is also contemplated that any feature may be specifically excluded from any embodiment of the invention.

We claim:

1. A buoyant simulated wetland system comprising:
    a normally-submerged, buoyant plant habitat, said normally-submerged plant habitat comprising a first buoyant blanket assembly having a top surface that is normally submerged, said first buoyant blanket assembly comprising a first non-woven mat and a first plurality of buoyant bodies disposed within said first non-woven mat;
    at least one first normally-not-submerged plant habitat that is attached to said top surface, said at least one normally-not-submerged plant habitat being comprised of a second buoyant blanket assembly that comprises a second non-woven mat and a second plurality of buoyant bodies disposed within said second non-woven mat; and at least one second normally-not-submerged plant habitat container that is attached to said top surface, said at least one second normally-not-submerged plant habitat being comprised of a container of said non-woven mat that encircles a portion of growth medium.

2. The buoyant simulated wetland system of claim 1 wherein said non-woven mat is comprised of fibers that are intertwined to form a blanket.

3. The buoyant simulated wetland system of claim 2 wherein said fibers are polyester fibers.

4. The buoyant simulated wetland system of claim 3 wherein said fibers have a diameter in the range of about 6 to about 300 denier.

5. The buoyant simulated wetland system of claim 2 wherein a water-based latex binder is baked onto said fibers.

6. The buoyant simulated wetland system of claim 1 wherein each of said plurality of buoyant bodies is comprised of a polyurethane foam.

7. The buoyant simulated wetland system of claim 1 wherein each of said plurality of buoyant bodies has a density in the range from 1.0 to 25.0 pounds per cubic foot.

8. The buoyant simulated wetland system of claim 1 wherein said growth medium is selected from the group consisting of peat, topsoil, hydrophilic foam, and a combination of these materials.

9. The buoyant simulated wetland system of claim 1 wherein said non-woven mat has a thickness of about eight inches.

10. The buoyant simulated wetland system of claim 1 wherein said normally-submerged, buoyant plant habitat comprises a bubble-trapping region having a permeability to bubbles that is lower than the permeability of other regions of said normally-submerged, buoyant plant habitat.

11. The normally-submerged, buoyant plant habitat of claim 10 wherein said bubble-trapping region is comprised of peat or polyethylene.

12. A buoyant simulated wetland system comprising:
   a normally-submerged, buoyant plant habitat, said normally-submerged plant habitat comprising a first buoyant blanket assembly having a top surface that is normally submerged, said first buoyant blanket assembly comprising a first non-woven mat and a first plurality of buoyant bodies disposed within said first non-woven mat; and
   at least one first normally-not-submerged plant habitat that is attached to said top surface, said at least one normally-not-submerged plant habitat being comprised of a second buoyant blanket assembly that comprises a second non-woven mat and a second plurality of buoyant bodies disposed within said second non-woven mat.

* * * * *